(No Model.)
A. BARTHOLOMEW.
WAGON FOR MOVING HEAVY OBJECTS.
No. 295,331. Patented Mar. 18, 1884.
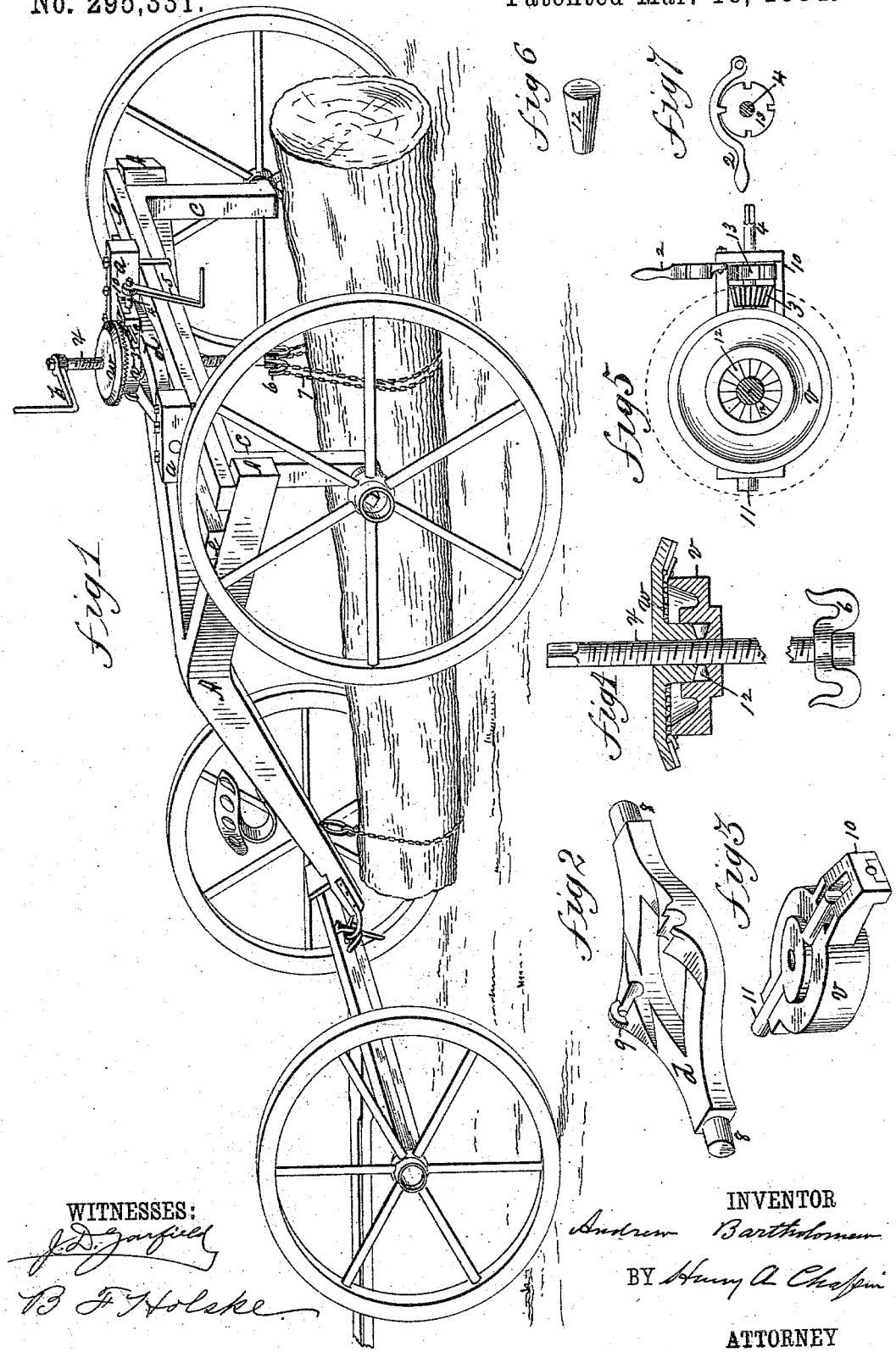
WITNESSES:
J. D. Garfield
B. F. Holske
INVENTOR
Andrew Bartholomew
BY Henry A. Chaffin
ATTORNEY

UNITED STATES PATENT OFFICE.

ANDREW BARTHOLOMEW, OF SPRINGFIELD, MASSACHUSETTS.

WAGON FOR MOVING HEAVY OBJECTS.

SPECIFICATION forming part of Letters Patent No. 295,331, dated March 18, 1884.

Application filed September 17, 1883. (No model.)

*To all whom it may concern:*

Be it known that I, ANDREW BARTHOLOMEW, a citizen of the United States, residing at Springfield, in the county of Hampden and State of Massachusetts, have invented new and useful Improvements in Vehicles for Transporting Heavy Objects, of which the following is a specification.

This invention relates to improvements in the construction of vehicles for elevating and transporting logs, stone, &c., and like heavy and ponderous objects, the object being to combine with the running-gear of such vehicles improved mechanism for lifting and lowering the object or objects to be transported, and for sustaining the weight of the same while it is being moved.

In the drawings, forming part of this specification, Figure 1 is a perspective view of a vehicle embodying my invention. Figs. 2 to 7, inclusive, are detail views.

In the drawings, A is the reach, attached by its forward end to the axle in any suitable manner, and having its rear bifurcated end resting or supported on the rear elevated axle, $c$, in the usual way. Two string-pieces, $e$, separated from each other, are secured on the top of the reach A over, or nearly over, the rear axle by strap-bolts and two blocks, $a$, as shown. The said blocks $a$ constitute bearings for the trunnions 8 of a rocking yoke, $d$, which supports the elevating and lowering mechanism, as hereinafter set forth. The yoke $d$ has an opening through it of elliptical form, and it is so located on the string-pieces $e$ $e$ that said opening is over the space between the latter, and it is sufficiently elevated above said pieces to permit it to rock more or less on its trunnions 8. The upper side of the yoke $d$ has formed in it, on opposite sides of the opening through it, semicircular bearings, in which rests a nut-case, $v$, and one of said bearings is provided with a semicircular strap, 9, which, with that part of the bearing opposite it, constitutes a short tube, through which a trunnion, 11, on the nut-case $v$ passes when the parts are assembled as shown in Fig. 5.

Fig. 3 is a bottom view of the nut-case, which has a circular central portion projecting from it, and each side of the latter are semicircular parts, which lie in the aforesaid bearings in the yoke $d$, whereby the nut-case is permitted to rock slightly on the yoke. A projection, 10, is formed on the side of the nut-case, and a short shaft, 4, has a bearing in the end of said projection or arm and in the side of the case. A notched collar, 13, and a beveled pinion, 3, are fixed on said shaft 4, and a stop-lever, 2, hung on arm 10, is provided with a tooth to engage with the notches in the collar 13. (See Figs. 5 and 7.) The nut-case $v$ is perforated centrally to let the screw-rod $x$ pass through it, and the base of a chamber within it is turned to an incline from said rod toward the side walls thereof, and upon said inclined base is arranged a series of conical rolls, 12. A nut, $w$, having a central portion entering said chamber in case $v$, and resting on said conical rolls 12, and threaded to receive rod $x$, is provided with a flanged top extending beyond the periphery of the nut-case, and the under side of said flange is provided with gear-teeth adapted to have the pinion 3 engage therewith. The upper end of the rod $x$ is adapted to have a crank, $b$, or other suitable instrument used with it to turn it in nut $w$, and the shaft 4 is turned in like manner to rotate said nut. To the lower end of rod $x$ is secured by swivel attachment the double hook 6. A chain, 7, encircles the object to be moved, and is attached to hook 6.

The manner of operating my improvements is as follows: The vehicle is placed over the log or other object, a chain, 7, is passed beneath the latter, and the hook 6 is lowered by turning the rod $x$ by the crank $b$. The chain is then secured to the hook, and rod $x$ is turned in the opposite direction, to elevate the latter and draw the chain tight, which having been done, the operator then throws off the stop-lever 2 from collar 13, and seizing crank 5 he turns shaft 4 and pinion 3, thus rotating nut $w$ and causing rod $x$ to be drawn upward, together with the load to which it is attached, and when the latter has been lifted high enough stop-lever 2 is thrown onto collar 13, to prevent shaft 4 and nut $w$ from turning.

In operating the above-described devices, to quickly turn rod $x$ for the purpose of attaching hook 6 to the chain and drawing up the slack of the latter, and sometimes for quickly lowering the load, said rod is turned by the crank $b$ to save time; but to obtain power requisite for lifting a great weight, nut $w$ is operated by turning shaft 4 and pinion 3 by crank 5. The whole weight of the load lifted by rod $x$ bears upon the base of the chamber in case $v$, in which nut $w$ turns, and to obviate frictional resistance as much as possible between the nut and the base of said chamber the conical friction-rolls 12 are placed in the latter, although they may be dispensed with, if desired. It will be seen that when the load is suspended on the rod $x$ and the nut $w$ and case $v$, the above-named parts are free to swing with the load to a certain extent by reason of the bearings which they have on the yoke $d$, and which the latter has in the blocks $a$, as above described, and therefore the screw-rod $x$ is not liable to become bent by any lateral strain.

What I claim as my invention is—

1. The combination, with a vehicle for transporting heavy objects, of the yoke $d$, hung on trunnions, the nut-case $v$, capable of rocking on said yoke, the nut $w$, having a geared border, the screw-rod $x$, provided with hook 6, the shaft 4, having pinion 3 and the collar 13 thereon, and the stop-lever 2, substantially as set forth.

2. In combination, the reach A, the yoke $d$, hung on trunnions, the nut-case $v$, capable of a rocking motion on said yoke, the nut $w$, having a geared border, the screw-rod $x$, provided with hook 6, and the shaft 4, having pinion 3 thereon, substantially as set forth.

ANDREW BARTHOLOMEW.

Witnesses:
H. A. CHAPIN,
J. D. GARFIELD.